March 17, 1953 T. F. CARMICHAEL 2,632,121
VIBRATORY ELECTRIC MOTOR AND TOOL DRIVEN THEREBY
Filed Aug. 8, 1949 3 Sheets-Sheet 1

Inventor
Thomas Frazer Carmichael
By J. S. Murray
Attorney

March 17, 1953     T. F. CARMICHAEL     2,632,121
VIBRATORY ELECTRIC MOTOR AND TOOL DRIVEN THEREBY
Filed Aug. 8, 1949     3 Sheets-Sheet 2
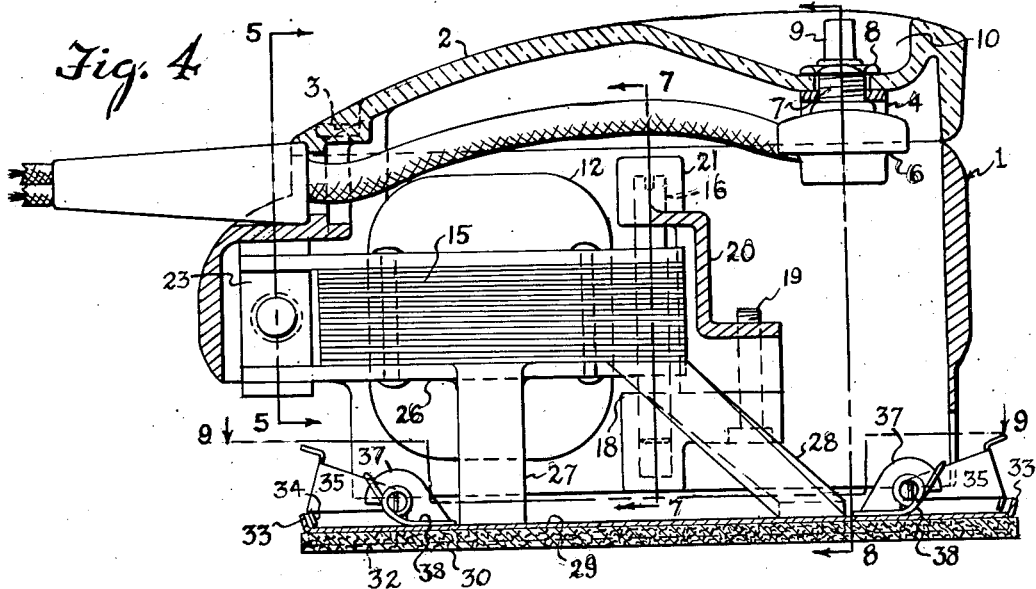
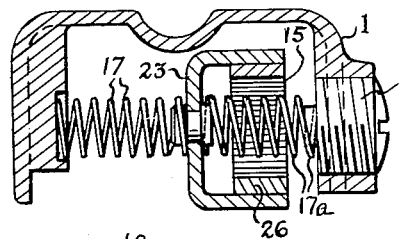
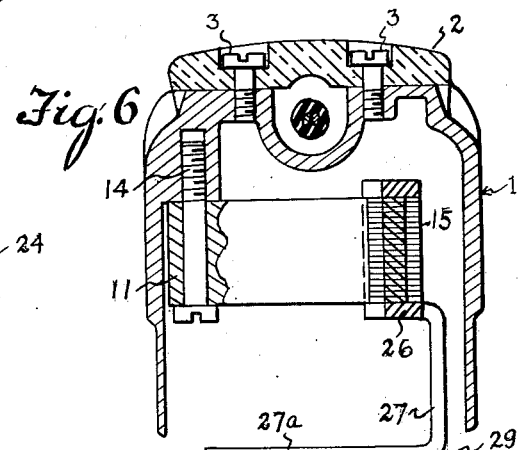
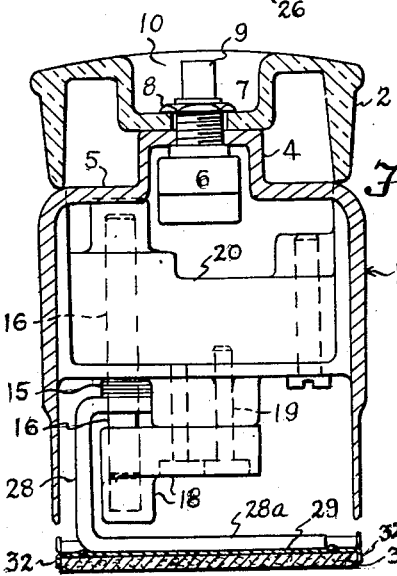
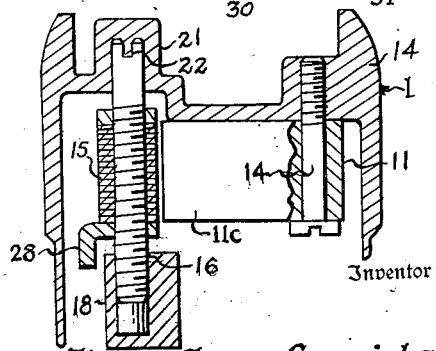
Inventor
Thomas Frazer Carmichael
By J. S. Murray
Attorney March 17, 1953   T. F. CARMICHAEL   2,632,121
VIBRATORY ELECTRIC MOTOR AND TOOL DRIVEN THEREBY
Filed Aug. 8, 1949   3 Sheets-Sheet 3
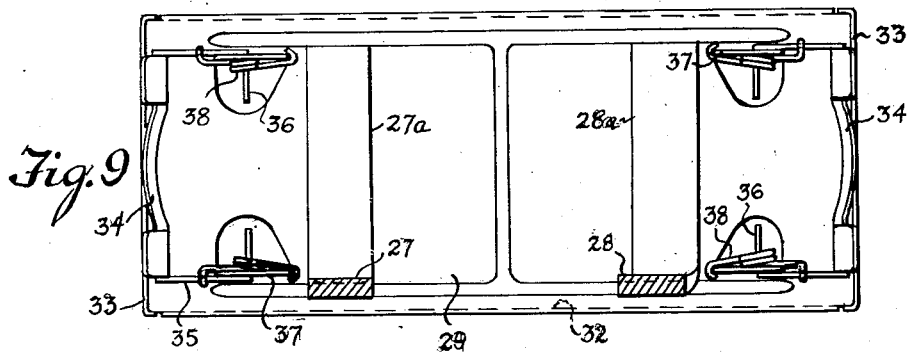
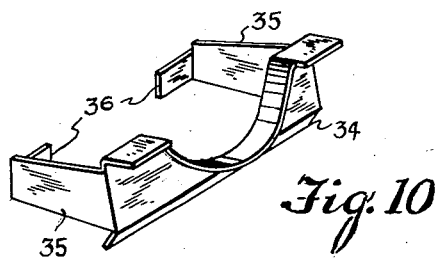
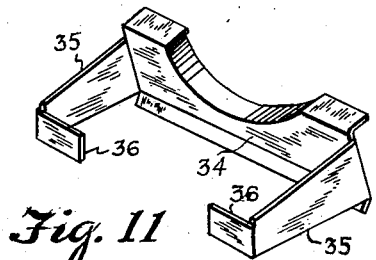
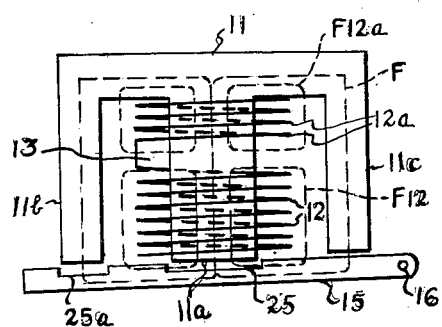
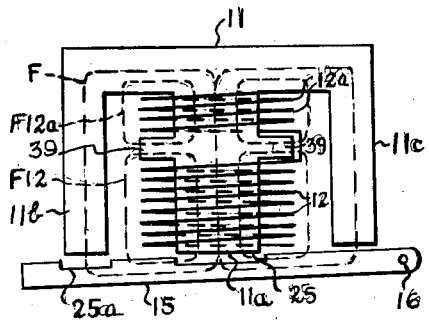
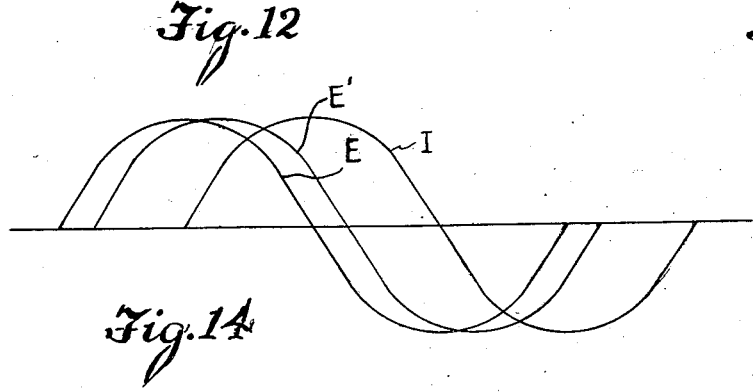
Inventor
Thomas Frazer Carmichael
By J. S. Murray
Attorney Patented Mar. 17, 1953

2,632,121

UNITED STATES PATENT OFFICE 2,632,121

VIBRATORY ELECTRIC MOTOR AND TOOL DRIVEN THEREBY

Thomas Frazer Carmichael, Rochester, Mich., assignor to Syncro Corporation, Rochester, Mich., a corporation of Michigan Application August 8, 1949, Serial No. 109,118
In Canada December 1, 1950

7 Claims. (Cl. 310—21)

This invention relates to vibratory electric motors and mechanisms driven by such motors.

An object of the invention is to provide an alternating current motor of the type correlating a swinging armature with an electromagnet, and to derive a polyphase flux effect in applying a single phase current to the magnet with a material increase of efficiency.

Another object is to so dispose a plurality of energizing coils on the magnet core of a single phase vibratory motor, as to derive an approximate polyphase flux effect whereby the motor more efficiently actuates a vibratory armature.

Another object is to subject the freely pivotal armature of a single phase vibratory motor to a pair of mutually opposing springs having characteristics predetermined to approximate a response of said armature to a field induced by a polyphase current, thereby gaining efficiency.

Another object is to apply a novel pivotal oscillating movement to a platen or the like in driving such platen from a vibratory electric motor.

Another object is to employ a novel drive connection to a platen from a vibratory armature.

Another object is to provide an improved pivotal mounting for the armature of a vibratory electric motor.

Another object is to provide in an improved manner for detachably securing a work-surfacing sheet of material on a vibratory platen.

Another object is to provide an improved switch installation on the casing of an electrically driven appliance.

These and various other objects are attained by the construction hereinafter described and illustrated in the accompanying drawings, wherein:

Fig. 4 is a longitudinal vertical section of the machine, taken on the line 4—4 of Fig. 1.

Fig. 5 is a cross sectional view of the machine taken on the line 5—5 of Fig. 4.

Fig. 6 is a cross section of the machine on the line 6—6 of Fig. 2.

Figures 1, 2, 3:
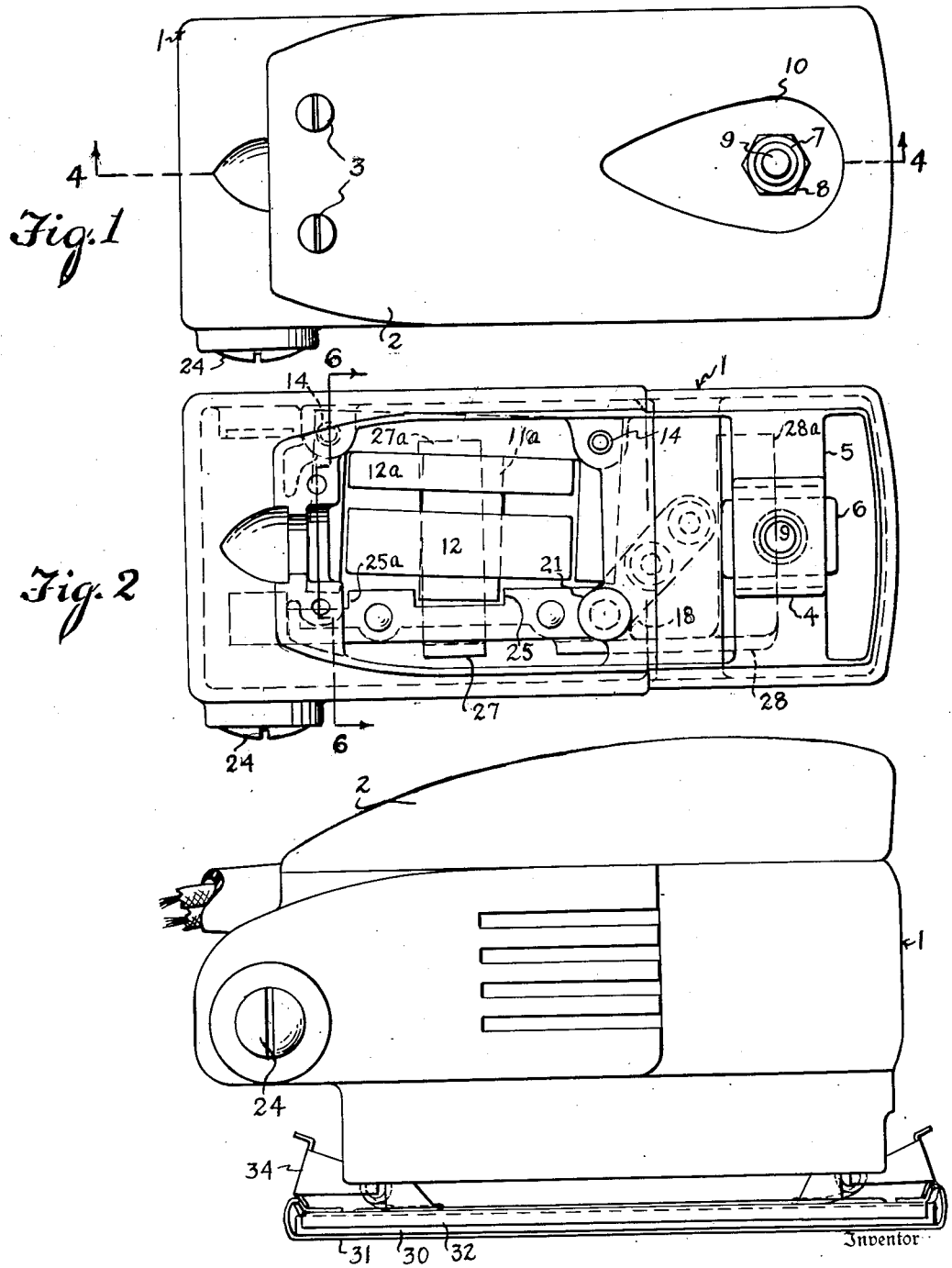
Fig. 1 is a top plan view of a sanding machine having our improved features.
Fig. 2 is a similar view of the machine with its casing cover removed.
Fig. 3 is a side elevational view of said machine.

Figs. 7 and 8 are cross sections taken respectively on the lines 7—7 and 8—8 of Fig. 4.

Fig. 9 is a horizontal cross section taken on the line 9—9 of Fig. 4 and particularly showing the platen of the machine.

Figs. 10 and 11 are perspective views of a clamping element used to secure sandpaper or the like on the platen.

Fig. 12 is a diagrammatic illustration of the windings applied to the magnet of our motor.

Fig. 13 is a similar view, showing a modification of the magnet core.

Fig. 14 is a sine wave view showing out-of-phase characteristics of electromotive forces and current incident to use of such windings as exemplified in Figs. 12 and 13.

Construction

In these views, the reference character 1 designates a substantially rectangular open-bottomed casing having at its top a cover plate 2 serving as a handle for the machine. The rear end of said plate is secured to the casing by two screws 3 and its front end is clamped to the arched mid portion 4 of a bridging strip 5 integrally joining the casing side walls. Set into said arched portion, as best appears in Fig. 8, is a switch 6 of any desired construction having a boss 7 upwardly projecting through said portion and through the front end of the cover plate, and engaged above the latter by a nut 8. Thus the nut clamps both the switch and cover plate to the casing. The boss 7 is tubular, accommodating the push button 9 of the switch, and the cover plate has a pocket 10 receiving the push button.

Installed in the casing 1 is an electromagnet controlled by the switch 6 and comprising a core 11 having a central polepiece 11a and lateral polepieces 11b and 11c. The polepiece 11a is wound with two series-connected coils 12 and 12a separated by an air gap 13 and more fully described hereinafter. It is preferred to so secure the yoke end of the core 11 to a side wall of the casing 1 by screws 14, that the polepieces project toward the other side wall, being spaced longitudinally of the casing. An elongated substantially rigid armature 15 is freely pivoted at an end thereof on a vertical pin 16 to vibrate to and from the pole pieces, the opposite end of the armature being subjected to opposing pressures of two coiled springs 17 and 17a. The lower end of the pin 16 is set into a blind socket in a block 18 fastened by one or more screws 19 to a strut 20 bridged between the casing side walls. The upper end of said pin is set into a socket member 21 integral with said strut, such end having a diametrical slot 22 receiving a rib in said socket to lock the pin from turning. A threaded portion of the pin engages a tapped opening in the armature whereby the latter is restrained from material shifting axially of the pin. The spring 17, compressed between a side wall of the casing and an extension 23 from the armature opposes response of the armature to magnetic attraction. The spring 17a, compressed between said extension and an adjusting nut 24 mounted in the other side wall of the casing, supplements magnetic attraction. Said springs are hereinafter described in detail. It is preferred to form the armature with vertical notches 25 and 25a to respectively accommodate end portions of the polepieces 11a and 11b, and these have a length slightly exceeding that of the polepiece 11c to permit such accommodation. This has the effect of reducing the air gap between the armature and polepieces, and increasing the initial flux response of the armature, gaining in such initial response without sacrifice of final response.

The armature comprises an underlying stamping 26 formed with two arms 27 and 28 projecting divergently downward and respectively having end portions 27a and 28a bent across the bottom opening of the casing. To such end portions is welded or otherwise rigidly secured a sheet metal platen 29, underlying the casing and having a pad 30 of felt or the like cemented or otherwise secured to its bottom face as a seat for a sheet 31 of sandpaper or other surfacing material. The latter margins of the platen are flanged slightly downward, as indicated at 32 to assist in properly positioning the pad 30. The platen end margins form slight upward flanges 33, across which the end portions of the sandpaper are bent to slightly overlap the top face of the platen. A pair of sheet metal clamps 34 (Figs. 10 and 11) respectively pivoted on the respective ends of the platen bear firmly down on said overlapping ends of the sandpaper, to hold it in place. Each such clamp comprises a mid portion extending substantially across the platen and a pair of parallel arms 35 having terminal pivot ends 36 bent toward each other. Each end of the platen is formed with a pair of struck-out upstanding hook-shaped lugs 37 to receive the pivot ends 36 of the corresponding clamp. A spring 38 is coiled on each pivot end 36 with one end portion applying a downthrust to the corresponding arm 35 and the other seating downwardly on the platen. The described clamping provision is inexpensive to produce and may be quite rapidly installed.

Operation

In use, the described appliance is held against a surface requiring sanding or other treatment, under suitable pressure manually applied to the plate 2. The switch 6 being closed, the armature vibrates at twice the applied alternating current frequency (since there are two oscillations per electrical cycle) to and from the magnet, such frequency being largely standardized at sixty cycles in the United States. The spring 17a assists the magnet in attracting the armature, and the spring 17 returns the armature to its outer vibration limit, the characteristics of these springs being hereinafter more fully explained. Use of the two arms 27 and 28 to mount the platen on the armature establishes a simple yet quite strong connection. Vibrating the platen angularly about the armature pivot achieves a highly effective surfacing treatment. Since the appliance will be advanced in the direction of its length, along any surface, and the vibration is substantially transverse to that direction, it is evident that a manual advance or retraction of the appliance cannot interfere in any way with the vibratory movement. It is evident, also, that the described appliance may serve many purposes other than sanding, as for example, polishing or scrubbing.

Advantage of a polyphase effect

Energization of a vibratory motor of the described type by diphase currents would be desirable, provided the phase angle were low enough to avoid material opposition of resulting fluxes. The gain would lie in an increase of current and consequent flux, particularly at the crests of the sine waves. Motors of the described type, as heretofore energized by single-phase currents, have been characterized by an inherently low line power factor, such as .20, the current lagging the voltage by approximately 90 degrees. Employing diphase or other polyphase currents entailing suitably low phase angles is productive of a higher line power factor by reducing the current lag relative to the voltage. The critical maximum overall phase angle in applying polyphase currents to a motor of described type is believed to closely approximate 45 electrical degrees. Since currents available are either single-phase or have unduly large phase angles, our construction seeks to derive the desired polyphase effect in applying a single-phase current to the described motor. Both electrical and mechanical means are employed in the construction described to secure the desired effect, but it is to be understood that employment of either such means materially increases efficiency over practice heretofore prevailing.

Electrical derivation of polyphase effect

In electromagnets heretofore used in vibratory motors, it has been the practice to employ a single magnetizing coil, installed commonly on the center polepiece of an E-shaped core. Leakage flux induced by such a magnet is generally small, resulting in a slight and unimportant efficiency decrease. Our improved construction, in providing two coils 12 and 12a, series-connected and with an intervening air gap 13, induces and utilizes quite material leakage fluxes as best appears in Fig. 12. In addition to the flux F mutually generated by the coils 12 and 12a and taking effect on the armature, said coils induce individual fluxes $F_{12}$ and $F_{12a}$ finding paths independent of the armature and hence of a leakage nature. The magnitude of the leakage fluxes depends on various factors and primarily the extent and reluctance of the gap 13. Thus if such gap were increased or decreased, a substantially proportionate increase or decrease of leakage flux would result. If the core is formed with extensions 39 into the gap as per Fig. 13, this creates a partial magnetic shunt, increasing flux leakage in proportion to resulting reluctance reduction. The leakage fluxes $F_{12}$ and $F_{12a}$ respectively induce voltages E and E' (Fig. 14) in the corresponding coils, and such voltages are relatively out of phase to an extent depending on the leakage flux reactance of the coils 12 and 12a. It is preferred to differentiate the coils 12 and 12a materially as regards their component turns, thus increasing the phase difference between currents individually induced by such coils. The effect attained is exemplified by Fig. 14, showing at E and E' the sine waves for the voltages applied to the two coils and showing at I the phase-displaced current applied by the voltage E.

*Mechanical derivation of polyphase effect*

The spring 17 has the function of returning the armature to its outermost position during each decay of the flux from a maximum to zero, or twice during each electrical cycle. In performing that function, the spring 17 additionally imposes a compression on the spring 17a, whereby the latter may supplement the flux in attracting the armature during the next quarter cycle. It follows that in order to secure the most efficient operation of the device, springs 17 and 17a must have differential characteristics. When the nut has been properly adjusted, the armature will vibrate smoothly and more powerfully than in the case of a single spring compressed by attraction of the armature to the magnet and releasing its energy during decay of the flux. The construction assures a storing up of spring energy as the armature approaches each of its limiting positions, and the release of such energy speeds up reversal of the armature swing with added power, particularly at zero values of the flux, to secure the effect of diphase currents separated by a phase angle of fairly small magnitude.

The described spring arrangement has other decided advantages over the prior practice of mounting the armature on a leaf spring which has at least one fixed margin and hence requires flexure to afford armature vibration. Any spring suited to support an armature while contributing to armature vibration must be much heavier than a spring exercising no supporting function. Moreover a spring functioning as an armature support must of course be installed at the supported end of the armature, and must hence act on the armature under a relatively low leverage. Such a spring therefore must be decidedly more heavy than the springs 17 and 17a taking effect on the free end of the armature and having benefit of a maximum leverage. A further advantage of the springs now disclosed lies in their adaptability to be readily suited, with respect to weight and frequency to best perform their intended functions.

What I claim is:

1. In a vibratory electromagnetic tool, the combination with an electromagnet and a coacting armature, of a fixed pivot for the armature allowing vibration to and from the magnet, a platen disposed transversely to the pivot axis of the armature, and a plurality of spaced arms mounting the platen substantially rigidly on the armature.

2. A vibratory electromagnetic tool as set forth in claim 1, said arms engaging the platen at opposite sides of and substantially equidistantly from said pivot axis.

3. In a vibratory electromagnetic tool, the combination with an electromagnet and a coacting vibratory armature, of means fixedly pivoting the armature adjacent to an end thereof for travel to and from the magnet, an element projecting from the free end of the armature and forming an abutment, a pair of coiled springs having ends oppositely engaging said abutment and adapted to respectively supplement and oppose the pull of the magnet, abutments for the other ends of the springs, one of the last-mentioned abutments being adjustable to regulate compression of the corresponding spring, and a platen disposed transversely to the pivot axis of the armature and secured thereto, and a platen adapted to support a surface treating element, said platen being spaced from said armature and supported thereby in a plane substantially normal to the pivotal axis of the armature, whereby said platen will vibrate in a substantially flat plane.

4. In a vibratory electric motor, a magnet comprising a core providing a flux path and a plurality of coils mounted in coaxial relation on said core, said coils being series-connected and spaced apart along the core to thereby induce leakage flux in each of said coils, means for supplying single-phase alternating current to said coils, and an armature mounted for vibratory travel to and from said core, whereby a polyphase flux effect is obtained in said armature.

5. The combination according to claim 4, said coils being differentially proportioned, whereby the leakage fluxes induced in said coils differ in magnitude.

6. In a vibratory electromagnetic tool, the combination with an electromagnet and an armature coacting with said electromagnet and having a fixed pivot, of a platen adapted to support a surface-treating element, said platen being spaced from said armature and supported thereby in a plane substantially normal to the pivotal axis of the armature, whereby said platen will vibrate in a substantially flat plane.

7. A vibratory electromagnetic tool comprising a casing having an open bottom, an electromagnet fixed within said casing, an armature having a fixed pivot within said casing for vibratory movement to and from said magnet, the pivotal mounting for said armature having a substantially vertical axis, a member disposed adjacent the open bottom of said casing and adapted to retain a surface-treating element, and means connecting said member to said armature, whereby said member will vibrate in a substantially flat plane.

THOMAS FRAZER CARMICHAEL.

REFERENCES CITED

The following references are of record in the file of this patent:

UNITED STATES PATENTS

| Number | Name | Date |
|---|---|---|
| Re. 19,817 | Wurzbach et al. | Jan. 7, 1936 |
| 244,347 | Watson | July 12, 1881 |
| 309,573 | Selden | Dec. 23, 1884 |
| 1,433,962 | Meyer | Oct. 31, 1922 |
| 1,479,834 | Reynolds | Jan. 8, 1924 |
| 1,522,260 | O'Leary | Jan. 6, 1925 |
| 1,688,966 | Kirwin et al. | May 8, 1928 |
| 2,076,195 | Fickel | Apr. 6, 1937 |
| 2,238,390 | Knopp | Apr. 15, 1941 |
| 2,280,610 | Young | Apr. 21, 1942 |
| 2,399,977 | Bardos | May 7, 1946 |

OTHER REFERENCES

"Magnets" by Underhill, first edition, published in 1924, McGraw Hill Book Company; Fig. 78, pages 60–68.